(12) United States Patent
Huang et al.

(10) Patent No.: US 9,990,090 B2
(45) Date of Patent: Jun. 5, 2018

(54) TOUCH DISPLAY DEVICE

(71) Applicant: Shenzhen China Star Optoelectronics Technology Co., Ltd., Shenzhen, Guangdong (CN)

(72) Inventors: Yao Li Huang, Guangdong (CN); Jun Xia, Guangdong (CN); Jianxing Xie, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 0 days. days.

(21) Appl. No.: 14/417,872

(22) PCT Filed: Jan. 21, 2015

(86) PCT No.: PCT/CN2015/071227
§ 371 (c)(1),
(2) Date: May 9, 2016

(87) PCT Pub. No.: WO2016/086525
PCT Pub. Date: Jun. 9, 2016

(65) Prior Publication Data
US 2016/0246399 A1    Aug. 25, 2016

(30) Foreign Application Priority Data
Dec. 4, 2014  (CN) .......................... 2014 1 0733662

(51) Int. Cl.
*G06F 3/044* (2006.01)
*G06F 3/041* (2006.01)
*G09G 3/20* (2006.01)

(52) U.S. Cl.
CPC ............ *G06F 3/044* (2013.01); *G06F 3/0412* (2013.01); *G09G 3/20* (2013.01)

(58) Field of Classification Search
CPC .......... G09G 3/20; G06F 3/0412; G06F 3/044
See application file for complete search history.

(56) References Cited

U.S. PATENT DOCUMENTS

| 2010/0123866 A1* | 5/2010 | Chang ............... G02F 1/136286 349/141 |
| 2014/0204051 A1* | 7/2014 | Park ...................... G06F 3/0412 345/174 |

(Continued)

FOREIGN PATENT DOCUMENTS

| CN | 101114656 A | 1/2008 |
| CN | 103235457 A | 8/2013 |

(Continued)

OTHER PUBLICATIONS

International Search Report and Written Opinion, dated Jan. 21, 2015, China.

*Primary Examiner* — Abhishek Sarma
(74) *Attorney, Agent, or Firm* — Kim Winston LLP

(57) ABSTRACT

Disclosed is a touch display device which belongs to the technical field of displays, and solves the technical problem that the existing capacitive touch screens are thick. The touch display device comprises: a sub-pixel unit array, each of the sub-pixel unit being provided a thin film transistor and a pixel electrode therein, with a first insulating layer and a second insulating layer provided between the thin film transistor and the pixel electrode; and an array of common electrodes and a plurality of address lines located between the first insulating layer and the second insulating layer, each of the common electrodes being connected to a drive circuit through an address line respectively.

8 Claims, 3 Drawing Sheets

(56) References Cited

U.S. PATENT DOCUMENTS

2015/0378474 A1* 12/2015 Liu .................. G06F 3/0412
                                                    345/174
2016/0294386 A1* 10/2016 Yang ................ G06F 3/0416

FOREIGN PATENT DOCUMENTS

| CN | 103941903 A | 7/2014 |
| CN | 104020905 A | 9/2014 |
| CN | 104022127 A | 9/2014 |
| EP | 2199891 A2 | 6/2010 |

* cited by examiner

TOUCH DISPLAY DEVICE

The present application claims benefit of Chinese patent application CN201410733662.X, entitled "Touch display device" and filed on Dec. 4, 2014, the entirety of which is incorporated herein by reference.

TECHNICAL FIELD

The present disclosure relates to the technical field of displays, and in particular, to a touch display device.

TECHNICAL BACKGROUND

With the development of display technologies, liquid crystal display devices have become the most common display devices.

In the meanwhile, with the popularization of smart electronic products, capacitive touch screens are also widely used in electronic products, such as cell phones, tablet PCs, etc. Currently, capacitive touch screens mainly use one glass solution (OGS), on-cell, and in-cell technologies. Compared with OGS and on-cell technologies, in-cell technology is superior in production process, and products using it are thinner, lighter, and more transparent.

In the process of implementing the present disclosure, the inventor found that the prior arts suffer from at least the following problem. That is, in the existing capacitive touch screens, two electrode layers, one for Tx circuit and the other for Rx circuit, are needed, which renders capacitive touch screens thick.

SUMMARY OF THE INVENTION

The objective of the present disclosure is to provide a touch display device to solve the technical problem that the existing capacitive touch screens are thick.

The present disclosure provides a touch display device which comprises: a sub-pixel unit array formed by a plurality of gate lines and a plurality of data lines, each of the sub-pixel units being provided a thin film transistor (TFT) and a pixel electrode therein, with a first insulating layer and a second insulating layer provided between the thin film transistor and the pixel electrode; and an array of common electrodes and a plurality of address lines located between the first insulating layer and the second insulating layer, each of the common electrodes being connected to a drive circuit through an address line respectively, wherein when an image is displayed, the common electrodes each are connected to a common voltage output end in the drive circuit through the address line, and when a touch signal is scanned, the common electrodes each are connected to a touch signal processor in the drive circuit through the address line.

Further, one common electrode corresponds to one or more of the sub-pixel units.

Preferably, a third insulating layer is provided between the common electrode and the address line. The common electrode is connected to the address line through a first via hole which is provided in the third insulating layer.

In one embodiment, the common electrode is located above the third insulating layer, and the address line is located below the third insulating layer.

In another embodiment, the common electrode is located below the third insulating layer, and the address line is located above the third insulating layer.

Further, the pixel electrode is connected to a drain of the thin film transistor through a second via hole which is provided in the first insulating layer, the second insulating layer, and the third insulating layer.

Preferably, the orthographic projection of the address line coincides with the data line.

Preferably, the address lines each are made of a metal material or a transparent conductor material.

The present disclosure achieves the following beneficial effects. According to the touch display device provided in the present disclosure, the displayed image and the touch signal are scanned at different times. When an image is displayed, the common electrode is connected to a common voltage output end in the drive circuit through the address line, forming an electric field between the common electrode and the pixel electrode; and when a touch signal is scanned, the common electrode is connected to a touch signal processor in the drive circuit through the address line, so as to receive the touch signal. Since each of the common electrodes is connected to the drive circuit through an address line respectively, i.e. each of the common electrodes in the array of common electrodes is independently connected to the drive circuit, the touch display device provided in the present disclosure is able to achieve the sensing of the touch signal merely by the array of common electrodes, thereby decreasing the thickness of the capacitive touch screen.

Other features and advantages of the present disclosure will be further explained in the following description, and will partly become self-evident therefrom, or be understood through the implementation of the present disclosure. The objectives and advantages of the present disclosure will be achieved through the structures specifically pointed out in the description, claims, and the accompanying drawings.

BRIEF DESCRIPTION OF THE DRAWINGS

For further illustrating the technical solutions provided in the embodiments of the present disclosure, a brief introduction will be given below to the accompanying drawings involved in the embodiments.

DETAILED DESCRIPTION OF THE EMBODIMENTS

The present disclosure will be explained in detail with reference to the embodiments and the accompanying drawings, so as to fully understand how to solve the technical problem and achieve the technical effects by the technical means according to the present disclosure, and thus implement the same. It should be noted that as long as there is no structural conflict, any of the embodiments and any of the technical features thereof may be combined with one another, and the technical solutions obtained therefrom all fall within the scope of the present disclosure.

Embodiment 1

Figure 1:
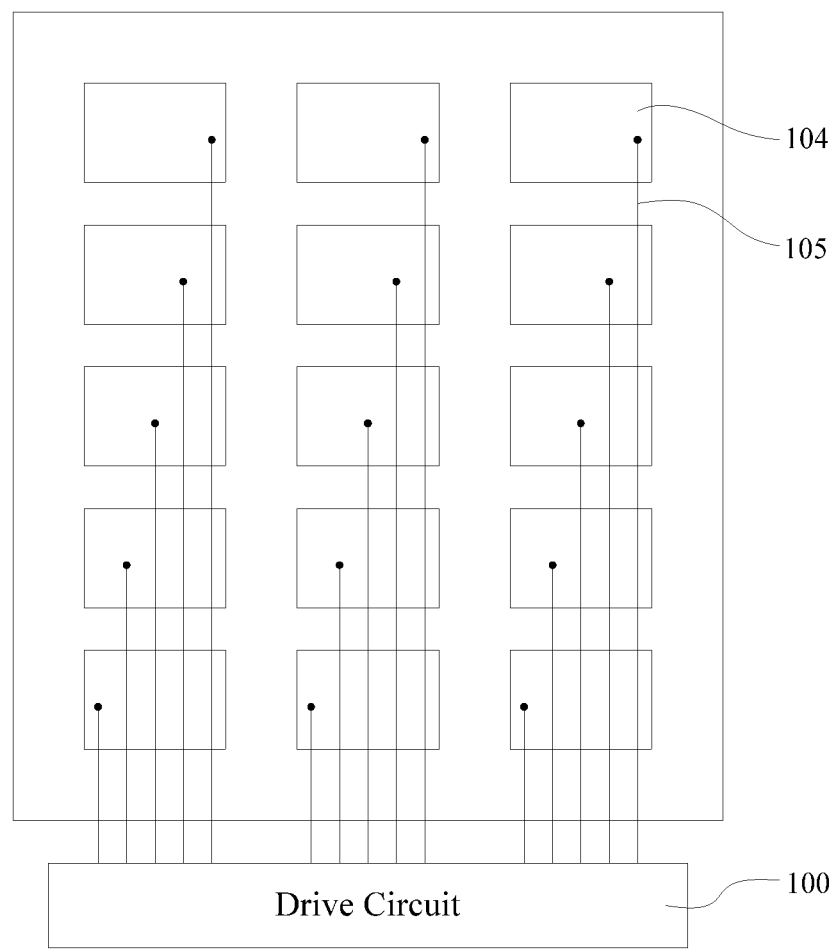
FIG. 1 schematically shows a touch display device according to embodiment 1 of the present disclosure.
Figure 2:
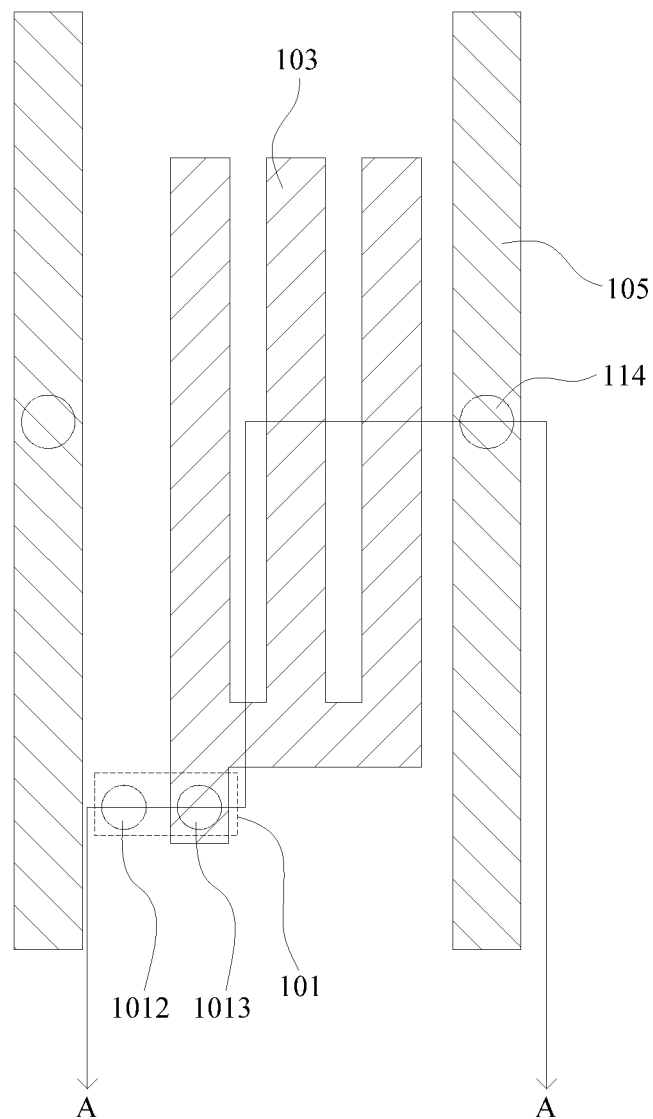
FIG. 2 schematically shows a plan view of the array substrate in the touch display device according to embodiment 1 of the present disclosure.
Figure 3:
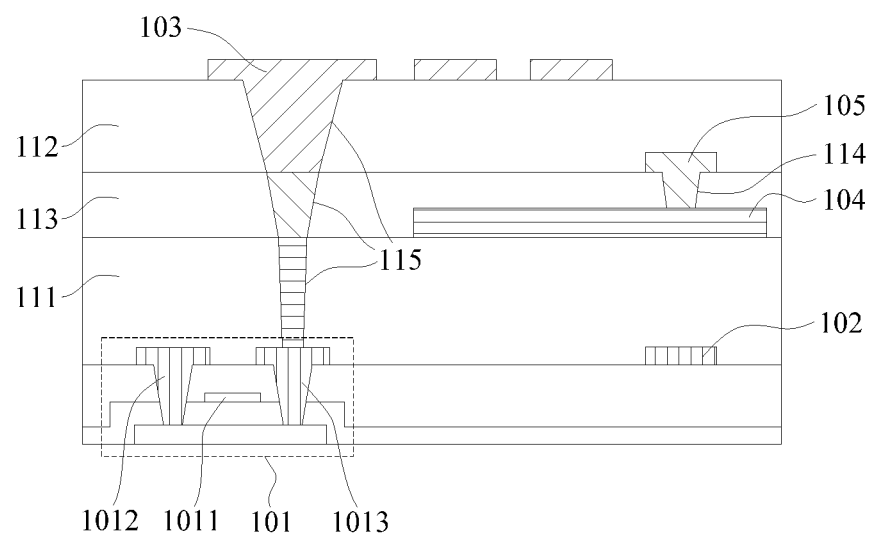
FIG. 3 schematically shows a cross-section along line A-A of FIG. 2.

As shown in FIGS. 1, 2, and 3, the present embodiment provides a capacitive touch display device which comprises an array substrate, a color filter substrate, a drive circuit 100 and the like. The array substrate comprises a sub-pixel unit array formed by a plurality of gate lines (not shown in the Figs.) and a plurality of data lines 102, each of the sub-pixel units being provided a thin film transistor 101 (TFT, which includes a gate 1011, a source 1012, and a drain 1013) and a pixel electrode 103 therein, with a first insulating layer 111 and a second insulating layer 112 provided between the thin film transistor 101 and the pixel electrode 103. The array substrate comprises further an array of common electrodes 104 and a plurality of address lines 105, each of the common electrodes 104 being connected to the drive circuit 100 through an address line 105 respectively, the array of common electrodes 104 and the address line 105 are located between the first insulating layer 111 and a second insulating layer 112. One common electrode 104 corresponds to one or more of the sub-pixel units.

According to the touch display device provided in the present embodiment, the displayed image and the touch signal are scanned at different times. When an image is displayed, the common electrode 104 is connected to a common voltage output end in the drive circuit 100 through the address line 105, forming an electric field between the common electrode 104 and the pixel electrode 103; and when a touch signal is scanned, the common electrode 104 is connected to a touch signal processor in the drive circuit 100 through the address line 105, so as to receive the touch signal.

Since each of the common electrodes 104 is connected to the drive circuit 100 through an address line 105 respectively, i.e. each of the common electrodes 104 in the array of common electrodes 104 is independently connected to the drive circuit 100, the touch display device provided in the present embodiment is able to achieve the sensing of the touch signal merely by the array of common electrodes 104, thereby decreasing the thickness of the capacitive touch screen.

In addition, the touch display device provided in the present embodiment adopts the self-capacitive touch technology, so that the sensors (namely the common electrodes 104) can be scanned and received simultaneously by means of common mode, in-phase, and same frequency signal, which reduces the time for scanning the touch signal, and increases the time for scanning the displayed image, thereby providing a favorable condition for a higher resolution of display. By adopting the self-capacitive touch technology in the embodiments of the present disclosure, a false touch report will not arise. And in case there is mist or dews on the screen, the touch report will still be carried on normally. Therefore, by using the self-capacitive touch technology, touch performance such as touch report rate and signal-to-noise ratio are improved.

As shown in FIG. 3, in the present embodiment, a third insulating layer 113 is provided between the common electrode 104 and the address line 105, the common electrode being located below the third insulating layer 113, and the address line 105 being located above the third insulating layer 113. The common electrode 104 is connected to the address line 105 through a first via hole 114 which is provided in the third insulating layer 113. Besides, the pixel electrode 103 is connected to a drain 1013 of the TFT 101 through a second via hole 115 which is provided in the first insulating layer 111, the second insulating layer 112, and the third insulating layer 113.

Preferably, the address lines each can be made of a metal material, and the address line 105 can be located right above the data line 102, i.e. the orthographic projection of the address line 105 coincides with the data line 102, which enables the address line 105 and the data line 102 to be both shielded by a same black matrix on the color filter substrate, thus avoiding the influence on the aperture ratio of the touch display device because of the address line 105.

The touch display device provided in the present embodiment is able to achieve the sensing of touch signal merely by the array of common electrodes 104, which can decrease the thickness of the capacitive touch screen, improve touch performance such as touch report rate and signal-to-noise ratio, and meanwhile, increase the scanning time, and thus provide a favorable condition for a higher resolution of display. Besides, according to the array substrate provided in the present embodiment, the touch sensing electrodes thereof can be obtained by the existing patterning procedure without improvement on manufacturing equipments.

Moreover, compared with the existing on-cell technology, the in-cell technology used in the present embodiment does not require a film structure on the outer surface of the array substrate and the color filter substrate. Therefore, after the patterning procedure is finished, the array substrate and the color filter substrate can be thinned to further decrease the thickness of the capacitive touch screen.

It should be noted that, in other embodiments, the address lines 105 each can be made of a transparent conductor material such as indium tin oxide (ITO), graphene, metal mesh, etc., thus rendering it possible to arrange the address lines in the display area outside the black matrix.

Embodiment 2

Figure 4:
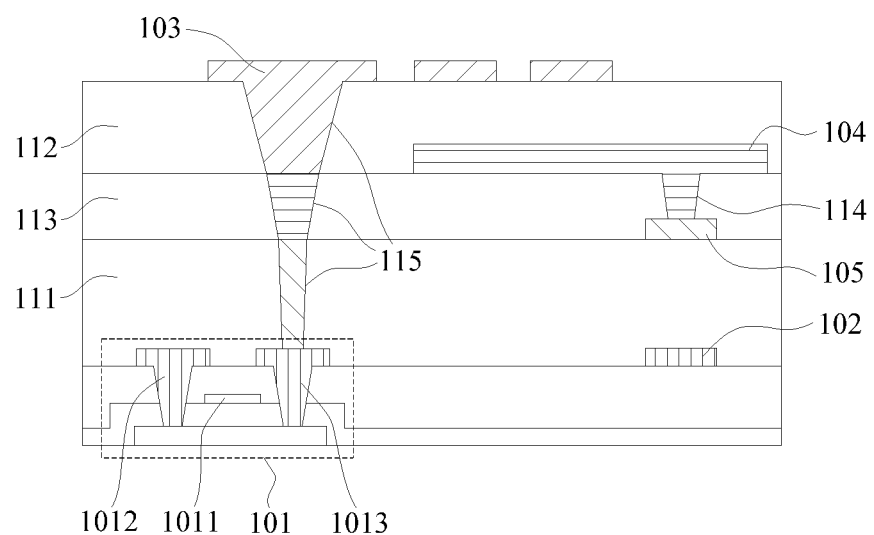
FIG. 4 schematically shows a plan view of an array substrate in the touch display device according to embodiment 2 of the present disclosure.

As shown in FIG. 4, the present embodiment provides a touch display device which is basically the same as that of embodiment 1, and the difference lies in that in the present embodiment, the common electrode 104 is located above the third insulating layer 113, and that the address line 105 is located below the third insulating layer 113. In the manufacturing process, the address line 105 is formed first by a patterning procedure, and then the common electrode 104 is formed by another patterning procedure.

Such arrangement renders the distance between the address line 105 and the pixel electrode 103 larger, which can, when an image is displayed, reduce the influence of the address line 105 on the electric field, thus achieving a better display effect, and can, when a touch signal is scanned, reduce the shielding effect of the address line 105 on the touch signal, thus improving the strength and the signal-to-noise ratio of the received touch signal.

The above embodiments are described only for better understanding, rather than restricting the present disclosure. Anyone skilled in the art can make amendments to the implementing forms or details without departing from the spirit and scope of the present disclosure. The scope of the present disclosure should still be subject to the scope defined in the claims.

The invention claimed is:

1. A touch display device, comprising:
 a sub-pixel unit array formed by a plurality of gate lines and a plurality of data lines, each of the sub-pixel units being provided a thin film transistor and a pixel electrode therein, with a first insulating layer and a second insulating layer provided between the thin film transistor and the pixel electrode, and
 an array of common electrodes and a plurality of address lines located between the first insulating layer and the second insulating layer, each of the common electrodes being connected to a drive circuit through an address line respectively,
 wherein when an image is displayed, the common electrodes each are connected to a common voltage output end in the drive circuit through the address line, and when a touch signal is scanned, the common electrodes each are connected to a touch signal processor in the drive circuit through the address line;

wherein one common electrode corresponds to more than one of the sub-pixel units.

2. The touch display device according to claim 1, wherein a third insulating layer is provided between the common electrode and the address line, and the common electrode is connected to the address line through a first via hole which is provided in the third insulating layer.

3. The touch display device according to claim 2, wherein the common electrode is located above the third insulating layer, and the address line is located below the third insulating layer.

4. The touch display device according to claim 3, wherein the pixel electrode is connected to a drain of the thin film transistor through a second via hole which is provided in the first insulating layer, the second insulating layer, and the third insulating layer.

5. The touch display device according to claim 2, wherein the common electrode is located below the third insulating layer, and the address line is located above the third insulating layer.

6. The touch display device according to claim 5, wherein the pixel electrode is connected to the drain of the thin film transistor through a second via hole which is provided in the first insulating layer, the second insulating layer, and the third insulating layer.

7. The touch display device according to claim 1, wherein the orthographic projection of the address line coincides with the data line.

8. The touch display device according to claim 1, wherein the address lines each are made of a metal material or a transparent conductor material.

* * * * *